June 4, 1957 T. J. R. BRIGHT 2,794,757
BEADING, MOULDING OR THE LIKE
Filed Nov. 12, 1953
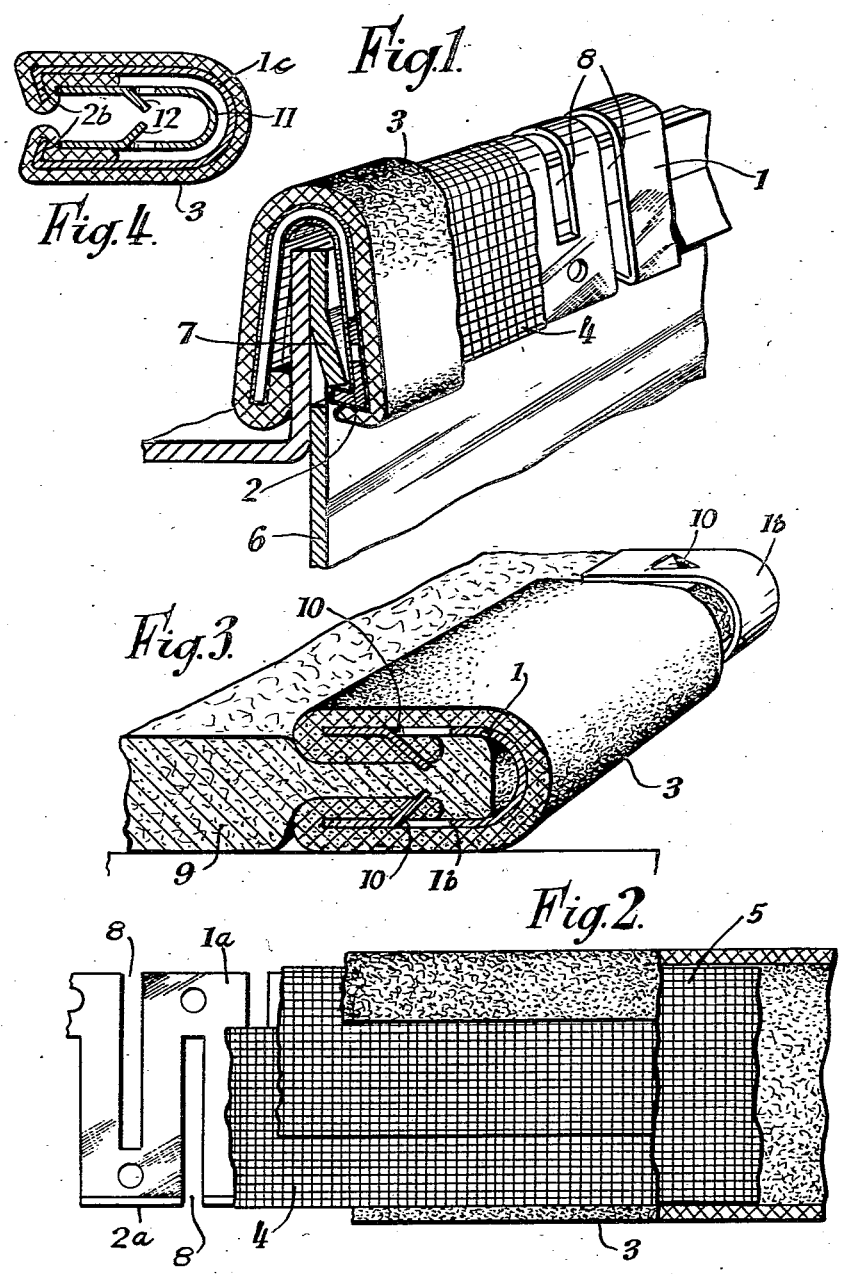
INVENTOR
Thomas John Robert Bright
BY
Stevens, Davis, Miller & Mosher
his ATTORNEYS United States Patent Office 2,794,757
Patented June 4, 1957

2,794,757

BEADING, MOULDING OR THE LIKE

Thomas John Robert Bright, Leek Wootton, Warwick, England

Application November 12, 1953, Serial No. 391,670

Claims priority, application Great Britain November 12, 1952

1 Claim. (Cl. 154—49)

The beading, moulding or the like, forming the subject of the present application has been designed primarily for application to vehicle bodies but has many other uses where it is desired to provide an ornamental and/or utilitarian edging to a flange or other supporting member. The beading, moulding or the like may, for example, be associated with a carpet for a vehicle or household carpet, the beading or moulding being intended to be fitted along the carpet edge and provide an ornamental edging which will be hard wearing and will prevent any tendency for the carpet to fray at the edges.

Motor vehicles as at present constructed, include a flange which surrounds the doors of the vehicle and hitherto, in accordance with a number of my earlier patents, I have proposed to fit a draught excluder strip on this flange which was sandwiched between the door and the flange to exclude draughts and moisture and generally to provide a good sealing effect. In certain motor vehicles it is now proposed to retain the flange which hitherto provided a support for the draught excluder strip but to stick or otherwise secure the draught excluder strip on the door flange and consequently, the problem arises of hiding the otherwise unsightly flange and generally providing an edging for the flange which will have an ornamental appearance, that is to say, it will harmonise with the interior upholstery or other parts of the vehicle and protect the comparatively sharp flange which either projects into the door opening or, alternatively, is directed towards the interior of the vehicle. It will be appreciated, therefore, that such a beading or moulding will not constitute the main means for excluding draughts and moisture but will mainly have an ornamental function although it will, to a small extent, assist in sealing the vehicle against the ingress of moisture and draught.

The chief object of the invention is to evolve a beading, moulding or the like which can be easily and cheaply manufactured, will have an ornamental appearance, can easily be applied to a flange or other component to which it is to be applied and, at the same time, when in position on said component, cannot be displaced or accidentally removed.

A beading, moulding or the like, in accordance with the present invention, comprises a channel-shaped clip composed of metal, plastic or other suitable material, the channel-shaped clip carrying an ornamental fabric or other covering which is intended to harmonise with the vehicle body or the component with which it is associated, the clip having a positive interlocking connection with the component or a frictional interengagement therewith.

The word clip is intended to cover a channel shaped member extending throughout the length of the beading or a series of such clips arranged end-to-end and if desired in spaced relationship, such comparatively short clips being in some cases referred to as tags and being of a springy nature so that they must necessarily be sprung onto the supporting flange or equivalent part.

Referring to the drawings:

Figure 1 is a fragmentary perspective view showing the beading applied to a flange-like support.

Figure 2 is an inverted plan view of the component prior to bending to its U shape form.

Figure 3 is a view showing a modified component in use as a carpet beading or edging.

Figure 4 is a cross-section of a further alternative form of beading.

In the embodiment of the invention as shown in Figures 1 and 2 as applied to beading or moulding intended for application to a supporting flange on a vehicle body, the clip 1 is produced from strip aluminum, steel or other suitable material and is formed at one or both edges with an upstanding lip or projection 2, the clip whilst in a flat condition as in Figure 2 being covered with a fabric or other covering material, the covering material being adhesively applied or secured thereon in any other suitable way, as for example, by sewing or by pressed out tangs, the strip being finally bent into substantially U or other channel section, the lip or lips projecting inwardly towards the centre of the U.

The covering material 3 is preferably a woven fabric which may, for example, have a pile surface which may, for example, be sprayed on, but it is within the scope of the invention to produce the covering of rubber or a suitable plastic. It is preferred to secure the covering to the clip by a suitable adhesive which might be unsatisfactory if applied direct to the metal clip and it is proposed first of all to enclose the clip in a comparatively thin open mesh material 4 generally known as scrim, the material being secured to the clip by glue or other adhesive, the adhesive finding its way through the open mesh. This material forms a good foundation for the covering material 3, the edges of the foundation material being preferably overlapped as in Figure 2. The covering material 3 is then glued or otherwise adhesively secured to the foundation material, one edge 5 of the covering material being preferably turned over the adjacent edge of the clip.

In the case of a clip produced from steel strip it has been found possible to dispense with the scrim covering and to apply the adhesive direct to the steel, the adhesive casting not only holding the covering in position but if applied to both faces of the steel strip preventing rust formation.

In some cases the supporting flange 6 will be formed with a series of laterally arranged projections 7 and in such a case, the lip or projection 2 on one or on both sides of the clip will be sprung over these projections, the clip, therefore, making a positive interlocking engagement therewith and thus preventing accidental removal or displacement. In this connection it will be appreciated that the clip can easily be sprung into position on the supporting flange, but when in position thereon, will very effectively resist any attempt to remove it therefrom. The tags may, if desired, be inserted in the component 1 prior to its application to the flange the tags being introduced into the component 1 at appropriately spaced intervals.

In some cases, for example, on a motor vehicle, the inside of the door will actually come into contact with the covering material and consequently the beading or moulding will assist in the exclusion of moisture and draughts. Also, the covering material may itself be specially treated to exclude moisture, dust or the like.

It is preferred that the strip from which the clip is formed shall be formed with a series of laterally arranged slots 8 which project inwardly from opposite edges of the strip, the slots being staggered and being each of a length a little more than half the width of the strip. It is, however, within the scope of the invention to slot the strip in any other desired manner. When the strip has been bent into its U shape the slots permit the clip to be bent around curves of quite small radius.

In the case of the application of the beading or moulding to the edge of a carpet as in Figure 3 it is preferred from the point of view of securing the beading or moulding firmly in position to form the component 1b with a series of spaced inwardly directed tangs 10 which when the beading is in position will bite into the upper and lower faces of the carpet 9 and thereby secure the beading firmly in position. To facilitate attachment it is proposed that the strip shall be bent into wide angle V shape in cross-section instead of the inverted U shape shown in Figure 1 the limbs of the V being pressed inwardly when the beading is applied so that the tangs enter the carpet and hold the beading firmly in position. In Figure 3 the scrim 4 has been omitted as it is considered that the covering 3 will be held sufficiently firmly if adhesively applied directly to the clip bearing in mind the fact that both longitudinal edges of the covering are turned inwardly and upwardly around the edges of the clip where they will be gripped by the upper and lower faces of the carpet. Alternatively the edges of the covering 3 may be extended as shown so that it is pierced and held in position by the inwardly directed tangs 10, in which case the use of adhesive may be dispensed with as the inwardly directed tangs will secure the covering to the clip, as well as to enter the carpet.

The covering material on the clip will assist in preventing the carpet from slipping on a polished surface the grip being, if necessary, improved by making the covering of rubber or including a rubber component which will engage the floor surface.

Although the construction shown in Figure 3 is primarily intended for use as a carpet edging its use is not necessarily confined to carpets. For example, this form of beading may be applied to a flange or like part which is not provided with a lateral projection or projections. In such a case the inwardly directed tangs will frictionally engage the flange and secure the beading in position.

In Figure 4 a construction is shown wherein the clip 1c is formed with two lips or projections 2b along its marginal edges, the covering material 3 enclosing the clip and having its marginal edges turned over the edges of the clip into the interior thereof. In this construction a series of spring tags 11 are introduced into the clip at spaced intervals, the tags being either sprung into position or introduced when the clip is bent into channel shape. The edges of the covering material will be sandwiched between the tags and the interior surface of the clip and consequently it may be unnecessary to use adhesive or other means to secure the covering in position. To enable the beading to be secured to the flange or other like support or to the edge of a carpet the tags are formed with inwardly pressed tangs 12 which will frictionally engage the opposite faces of the flange or other support. Although it is preferred to use a plurality of tags suitably spaced apart throughout the length of the beading, the tags may take the form of a clip extending throughout the length of the beading and fitting within the main clip 1.

Instead of securing the covering material in position on the clip by the methods previously mentioned, the covering may be stitched in position. In the case of a covering material which is actually produced as a moulding or extrusion, the covering material may, for example, be composed of natural or synthetic rubber or a suitable plastic and in such a case the covering material may be turned over one or both edges of the clip and secured by a series of tangs. The tanged edge of the covering material may itself be turned inwardly to overlie the lip or both edges and/or lips or projections on the clip, this inwardly directed edge on the covering material having the useful purpose of preventing moisture from obtaining access into the interior of the clip or the supporting flange.

It is preferred that the clip when in flat form, shall be covered with the fabric or other covering material, the edge or edges of the clip being, if desired, turned over to grip the edges of the covering, the strip being then bent to the required U or wide angle V shape and bent along one edge, if necessary, to provide the inwardly directed lip which is intended to make positive interlocking engagement with the flange or parts associated therewith. Although it is preferred to make the clip of metal it may be produced from a suitable thermo-plastic or thermo-hardening composition or other suitable material.

I claim:

A beading for use on carpet edging and the like comprising a channel shaped clip member having substantially parallel shank portions each having inwardly extending projections thereon, said projections positioned intermediate of said shank portions, and a fabric material covering the outer surface of said clip, the longitudinal edges of said material being turned inwardly and upwardly into the interior of the clip to form a covering on the inside surface of said shank portions with its edges nearer to the bend than the projections from the respective shank, to form opposing flat bearing surfaces for holding said clip on said edging, said projections piercing through the material to provide projections beyond said fabric for engaging said carpet to provide with said flat surface securing of the fabric against accidental displacement, said clip member being formed with spaced staggered slots alternately extending inwardly from opposite edges of said shank portions, said slots terminating in the opposite shank portion from which it entered thereby rendering the channel shaped beading capable of universal bending movement.

References Cited in the file of this patent

UNITED STATES PATENTS

| | | |
|---|---|---|
| 1,052,617 | Norman | Feb. 11, 1913 |
| 1,375,914 | Kimbark | Aug. 26, 1921 |
| 1,521,168 | Bailey | Dec. 30, 1924 |
| 2,231,316 | Bailey | Feb. 11, 1941 |
| 2,446,516 | Bailey | Aug. 10, 1948 |
| 2,554,452 | Bright | May 22, 1951 |
| 2,643,963 | Jaasund | June 30, 1953 |
| 2,693,011 | Fernberg | Nov. 2, 1954 |
| 2,704,867 | Dalziel et al. | Mar. 29, 1955 |